May 13, 1941.  H. R. MOULTON  2,241,415
OPHTHALMIC LENS
Filed Aug. 2, 1937    2 Sheets-Sheet 1
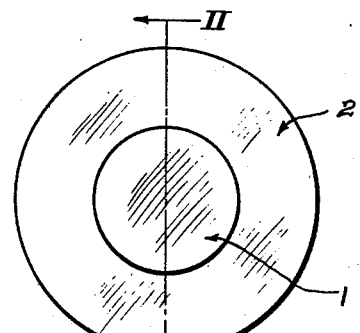
FIG. I
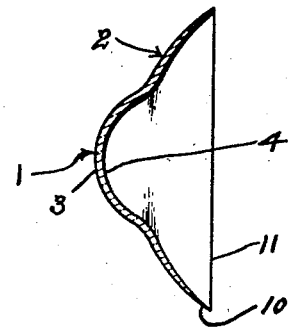
FIG. II
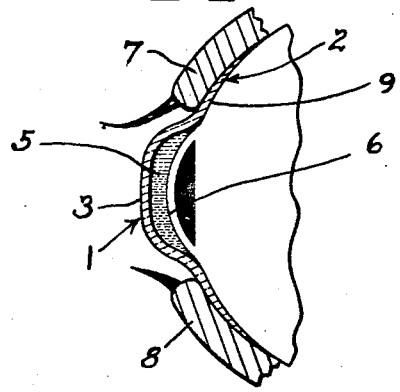
FIG. III
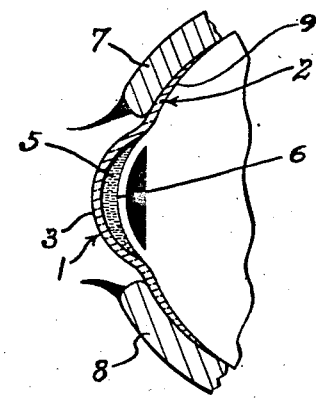
FIG. IV
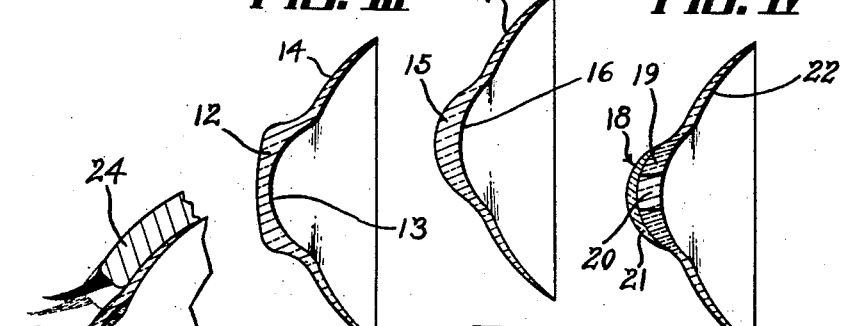
FIG. V   FIG. VI   FIG. VII
FIG. VIII
INVENTOR
HAROLD R. MOULTON
BY Harry H. Styll
ATTORNEY May 13, 1941.  H. R. MOULTON  2,241,415
OPHTHALMIC LENS
Filed Aug. 2, 1937  2 Sheets-Sheet 2
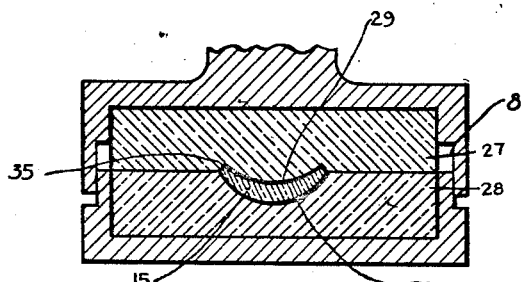
FIG. IX
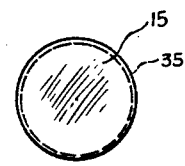
FIG. XI
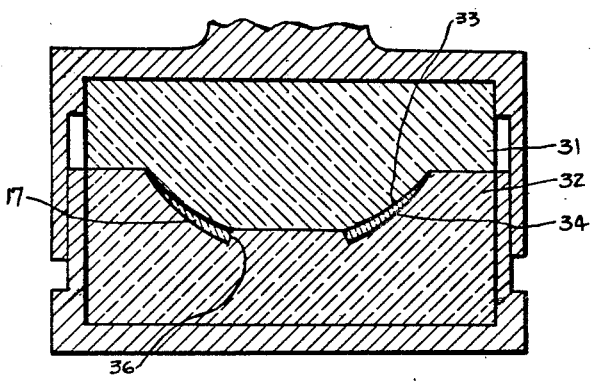
FIG. X
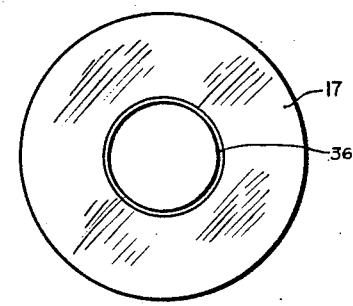
FIG. XII
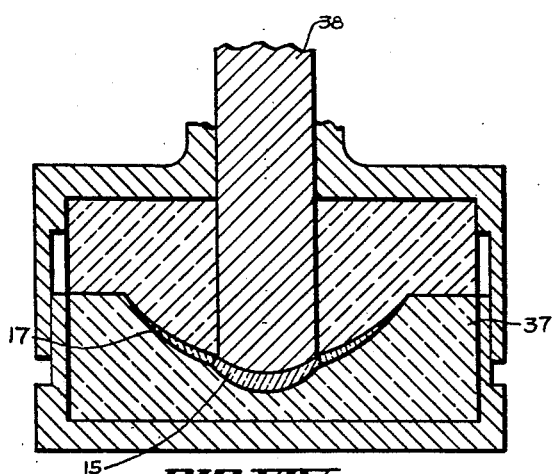
FIG. XIV
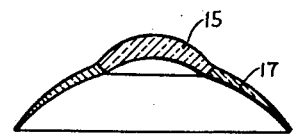
FIG. XIII
INVENTOR
HAROLD R. MOULTON
BY
Harry H. Styll
ATTORNEY Patented May 13, 1941

2,241,415

UNITED STATES PATENT OFFICE 2,241,415

OPHTHALMIC LENS

Harold R. Moulton, Southbridge, Mass., assignor to American Optical Company, Southbridge, Mass., a voluntary association of Massachusetts Application August 2, 1937, Serial No. 156,985

4 Claims. (Cl. 88—54.5)

This invention relates to improvements in lenses and has particular reference to improved means and methods of making contact lens or lenses adapted to be supported between the eye and eye-lids of the wearer.

One of the principal objects of the invention is to provide contact lenses and methods of making the same which are exceedingly light in weight, clear and transparent, and of tough, non-corrosive and infrangible material.

Another important object of the invention is to provide a contact lens formed of artificial resin, resins, resinoid and/or resinoids, having the properties of a vitreous body and method of making the same.

Another object of the invention is to provide a lens of the above character having its main lens portion formed of relatively hard resinous material, and having a supporting portion formed relatively thin, soft, pliable and slightly elastic.

Another object of the invention is to provide novel means and method of forming lenses of the above character.

Another object is to provide lenses of the above character and method of making the same wherein the supporting portion thereof, will be porous and shaped substantially to the general surface contour of the sclera of the eye.

Another object is to provide lenses of the above character and method of making the same, wherein the portion overlying the cornea of the eye may be formed to different colors, and with an artificial iris simulating the general appearance of the iris of the human eye.

Another object is to provide lenses of the above character with a refractive correcting portion which is soft and variable so that the said corrective portion may be compressed by the eye-lid to change its refractive value.

Another object is to provide a lens of the above character, having as an element controlling its refractive power, its thickness and index of refraction, plus the index refraction of a lubricating solution positioned beneath the lens and the cornea of the eye.

Another object is to provide lenses of the above character which will permit the economical manufacture of spherical, cylindrical, toric and aspherical surfaces such as torics, bi-torics, hyperboloidals, ellipsoidals or surfaces having various combinations of these characteristics for correcting the focal errors, as well as size shape magnification errors, either separately or jointly.

Another object is to provide lenses of the above character formed of resinous materials having incorporated, therein, local anesthetics and/or antiseptics.

Another object is to provide lenses of the above character having incorporated, therein, ultra-violet and/or infra-red absorption means.

Other objects and advantages of the invention will become apparent from the following description taken in connection with the accompanying drawings. It will be apparent that many changes will be made in the details of construction, arrangement of parts and steps of processes shown and described without departing from the spirit of the invention as expressed in the accompanying claims. I, therefore, do not wish to be limited to the exact details of construction, arrangement of parts and steps of the processes shown and described, as the preferred forms only have been given by way of illustration.

Referring to the drawings:

Fig. I is a front elevation of a lens embodying the invention;

Fig. II is a sectional view taken on line II—II of Fig. I;

Fig. III is a view generally similar to Fig. II, showing the lens in position before the eye, and illustrating a minus type lens;

Fig. IV is a view similar to Fig. III, showing a plus type lens;

Figs. V, VI and VII are views similar to Fig. II showing the modified forms of the invention;

Fig. VIII is a view similar to Fig. IV of a further modification of the invention;

Fig. IX is a sectional view illustrating a step in one of the processes of manufacture;

Fig. X is a view similar to Fig. IX illustrating another step of said process;

Fig. XI is a face view of the part of the lens embodying the invention formed by the step of the process illustrated in Fig. IX;

Fig. XII is a view similar to Fig. XI of the portion formed by the step of the process illustrated in Fig. X;

Fig. XIII is a sectional view showing the combining portions illustrated in Figs. XI and XII; and Fig. XIV is a view generally similar to Fig. IX, illustrating a step of another process of manufacture.

Lenses, known in the art as contact lenses, have in most instances in the past, been formed of a glass composition. Such compositions are exceptionally heavy and if made thin to reduce their weight, are fragile and easily shattered.

Such lenses, therefore, greatly endangered the eyes of the wearer, and in most instances were undesirable for use. This was not only due to the readily shatterable nature of such lenses, but also due to the stiffness and hardness of such compositions which caused irritations and discomfort.

Some attempts have been made to use plastic cellulose compositions; but due to their lack of clearness and transparency which retard the transmission of visible rays, and due also to their exceptionally corrosive and tarnishable nature, particularly in the presence of the tear solution of the eyes were also undesirable and impractical for use.

The present invention is, therefore, directed primarily to the provision of contact lenses and method of making the same whereby the said lenses will be very clear, transparent, light in weight, non-corrosive, non-shatterable and non-tarnishable and will have a supporting portion which is relatively soft, pliable, and elastic, and exceptionally comfortable and durable in use.

Referring more particularly to the drawings wherein like characters of reference designate like parts throughout the several views, the lens embodying the invention as shown in Figs. I to IV inclusive, comprises a main lens portion 1 and supporting portion 2 formed of transparent resinous substances.

The portion 1 is preferably formed of completely polymerized straight monomeric methyl methacrylate containing benzoyl peroxide as a catalyst and is relatively hard and has a smooth optical surface 3 on the outer face thereof. The surface 4, in this particular type of lens, may or may not be a smooth optical finish, particularly when used with a liquid solution of substantially the same index of refraction as the material of said lens.

The portion 2 is preferably formed soft, pliable and elastic by mixing with partially polymerized methyl methacrylate a suitable plasticizer such as dibutyl phthalate, methyl phthalyl ethyl glycolate, dibutoxy ethyl phthalate or triglycol dihexoate, etc., and completely polymerizing.

If desired, acrylate or methacrylate of higher alcohol, or alcohols, such as propyl, butyl, etc., may be used instead of the above propyl acrylate, propyl methacrylate, butyl acrylate, butyl methacrylate, etc. All of the above are completely polymerized and will be soft and pliable and yet elastic and will retain the form taken during polymerization.

In this particular instance, the portions 1 and 2 are formed in integral relation with each other by first mixing the material required for each by separate part, shaping said materials, while in a partially polymerized state, to the finished shape desired and to engage with each other and thereafter completing the polymerization.

In Fig. III a lens of the type disclosed above is shown in position of use on the eye. In this particular instance, there is illustrated a minus type lens which obtains its minus power by the relatively shallow curvature of its outer surface 3, and by the index of refraction of the solution 5. The solution 5 is formed by the combining of water with suitable salts, or may be formed by an isotonic water solution comprising water, boric acid and sodium chloride, or similar solutions. The lens obtains its minus power because of the fact that its front surface 3 has a shallower curve than the surface 6 of the cornea.

In Fig. IV, there is shown a plus type lens which obtains its plus power by having a surface 3 which is of a shorter radius than the surface 6 of the cornea. It will be seen that the surface 6 of the cornea, in this particular instance, causes the salt solution, in engagement with the cornea, to assume the curved shape of said cornea.

The portion 2 is shaped to fit beneath the upper and lower eye-lids 7 and 8 and to have an inner surface 9 shaped to the general surface contour of the sclera of the eye. Due to the fact, however, that this portion 2 is plastic, pliable and elastic, and that it is formed relatively thin, it will tend to shape itself to the outer contour surface of the sclera. These self-adjusting characteristics compensate for slight departures of the inner surface 9 from the exact true surface shape of the sclera. It will also be noted that the portion 2 is tapered outwardly, as illustrated at 10, to a relatively thin edge 11. This provides means whereby the eye-lids will be gradually wedged outwardly from engagement with the surface of the eye-ball and provides a comfortably fitting arrangement.

The portion 2 may, if desired, be formed porous or microporous to allow eye secretions to pass through to said portion 2. This also allows free circulation of the tear solution of the eye, and prevents surface irritations, etc. The said portion 2 may be perforated mechanically, or the resinous materials from which the portion 2 is formed may, prior to polymerization, be mixed with water soluble particles, or other particles soluble in solutions which will not attack the resinous material from which the portion 2 is formed. This mixing takes place before polymerization. After the portion 2 has been completely polymerized, the water or other soluble particles are dissolved, causing the resinous material to be porous.

The portion 2 may be provided with a local anesthetic or with a suitable antiseptic, or both by incorporating said anesthetic, or antiseptic, in said resinous material prior to completing the polymerization.

The optical characteristics of the lens portion 1 may be any of those known in the art.

The portion 1 may, if desired, be provided with absorptive properties to ultra-violet and/or infra-red rays, as well as to the visible rays, by the incorporation of materials compatible with the ingredients of the lens such as organic dyestuffs, which will retard the visible or invisible rays, such as Sudan III, Chrysoddin, etc. In general, yellow or red dyestuffs solution in this manner will retard the ultra-violet rays and may be used in varying quantities depending on the absorption properties desired. In the case of infra-red absorption, a thin film of material such as gold or aluminum, to reflect and/or absorb the infra-red rays may be applied to one of the surfaces of the lens. Ferrous compounds in finely divided form may be dispersed in the resinous material in its unpolymerized condition to render to said resultant article infra-red absorbent.

Alkaloidal compounds such as quinine, etc. may be dissolved in the resinous material for the purpose of producing ultra-violet absorption, the quantity thereof, being varied to control said absorption properties.

The index of refraction and/or the dispersive value of the resinous material may be varied and controlled, if desired. This is brought about by mixing with the straight polymer of monomeric methyl methacrylate and benzoyl peroxide varying quantities of halogenated hydrocarbons of the nature of chlorinated diphenyl, or other compounds miscible with said straight polymer. Varying quantities of monomeric methyl methacrylate, benzoyl peroxide and parts of chlorinated diphenyl derivative, such as Aroclor No. 1242 or No. 4465, may be combined.

Fig. V illustrates a sectional view of a lens generally similar to the lens shown in Fig. III. The only difference being that the power factor, or the prescriptive characteristics of the lens has as a controlling element thereof substantially only the index of refraction of the material from which the main lens portion 12 is formed. It will be noted that the inner surface 13 is shaped to have a close substantially intimate fit with the cornea of the eye. The outer supporting portion 14 may be made soft, pliable, and elastic, and may be formed solid or porous as desired.

The lens illustrated in Fig. VI, is of the type illustrated in Fig. V, except that its main corrective portion 15 has a plus power and is provided with an inner surface 16 shaped to have a substantially intimate contact with the cornea of the eye. The outer portion 17 may have all of the characteristics referred to above in connection with the portion 14.

Fig. VII illustrates a lens having its corrective portion 18 provided with an artificial iris 19. The iris portion 19 is formed to different colors by mixing suitable dyes with the resinous material from which that portion of the corrective lens 18 is formed. The artificial pupil is illustrated at 20 and is formed of clear transparent material.

To produce a more natural effect, the iris portion 19 is provided with a transparent layer of clear, colorless resin 21. In forming the above lens the colored portion 19, pupil 20 and clear transparent coating 21, may be formed separately and thereafter united through the use of a suitable solvent, such as ethyl acetate or other suitable solutions.

It is quite obvious, if desired, that the portions 20 and 21, may be formed integral and may be secured to the iris portion 19 in the above manner.

The supporting portion 22 may be formed relatively hard and rigid or soft, pliable and elastic and may be porous or solid, as desired.

In Fig. VIII there is shown another modified form of the invention wherein the main lens portion 23 is formed soft, pliable and elastic, or with characteristics similar to the supporting portions of the lenses previously described.

It is to be understood that in instances wherein soft, pliable and elastic supports are used, the main lens portion 1 or 15 may be formed of any desirable hard transparent vitreous material.

The object of forming the lens portion relatively thin, soft, pliable and elastic is to provide means whereby a pressure may be exerted adjacent to the peripheral edges of the main lens portion 23 by closing in the eye-lids 24, as illustrated by the dotted lines 25. The salt or similar solution 26 fills in the space between the portion 23 and cornea of the eye created by deforming said portion 23. This arrangement provides means whereby the corrective value of the main lens portion may be varied at will.

In Figs. IX to XIII inclusive one of the processes of manufacture is diagrammatically illustrated. In this particular instance, the lens is of the type illustrated in Fig. VI. It is to be understood that this same process may be applied to any or all of the lenses shown and described above.

Suitable molding or casting dies 27 and 28 having surfaces 29 and 30 formed thereon, contrageneric to the outer and inner surfaces of the main lens portion 15, are provided. The portions 27 and 28 may, however, be formed of stainless steel, chrom-nickel or any other suitable material on which highly polished surfaces may be formed. The portions 27 and 28 are supported in aligned relation with each other so that one of the said portions may be moved toward and away from the other, while being maintained in said aligned relation.

Suitable molding or casting dies 31 and 32 are also provided for forming the outer supporting portion 17. In this particular instance, the portions 31 and 32 are formed of material similar to the portions 27 and 28, but are provided with surfaces 33 and 34 contrageneric to the outer and inner surfaces of the portion 17, and also to such a relation as to form the thickness and tapered section desired.

In carrying out that part of the process of forming the main lens portion 15, a suitable resin, or mixture of resins, is selected, such as methyl methacrylate or other esters of methacrylic acid or of substituted acrylic acids capable of being polymerized to vitreous materials under the influence of heat and catalysts, such as benzoyl peroxide and/or similar means.

One dissolves in monomeric methyl methacrylate 0.02% or more of benzoyl peroxide, and heats in a glass or glass container equipped with a reflux condenser until polymerization begins, and progresses until the partially polymerized methyl methacrylate obtains a suitable syrupy consistency. The resulting intermediate product is chilled to arrest or retard the polymerization. This chilling, of course, is optional.

The molding or casting surfaces 29 and 30 are properly prepared by thoroughly cleaning, and if desired, to prevent possible adhesion, treated with glycerine, an aqueous solution of zinc chloride or other materials not soluble in the partially polymerized intermediate product and the excess carefully removed. A suitable quantity of partially polymerized methyl methacrylate, adequate to fill the space between the surfaces 29 and 30, when the molding or casting dies 27 and 28 are in fitted relation, is poured or otherwise placed in the lower casting or molding die 28 and into engagement with the surface 30. The die 27 is then brought down into engagement with the partially polymerized material to close in the said dies and shape the material to the shape of the main lens 15 and simultaneously form an angled peripheral edge 35.

The dies, containing the partially polymerized intermediate product, are then subjected to heat of a temperature ranging from 60 degrees to 85 degrees C. to complete the polymerization. The material is allowed to cool, while in this position, until it hardens and is then removed.

The opposed surfaces of the article thus formed will be found to have assumed the shape of the surfaces 29 and 30, and will have a highly polished optical finish.

Although the above outlined process has proven very satisfactory, a device such as shown in Fig. IX may be used to shape completely polymerized resin or resinoid material. This is accomplished by heating the polymerized material to render it plastic and pliable. While in this plastic state, place it between the molding dies, or dies similar to those 27 and 28, and compress to the shape of said dies. In this instance, the molding dies 27 and 28, or dies similar thereto, may be heated if desired. It is to be understood, however, that the said heated materials and dies are allowed to cool prior to removing the shaped resinous material therefrom.

It is also possible to use completely polymerized material in sheet or powdered form and compress the same between heated dies with or without first heating the said material.

If it is desired to provide the main lens portion 15 with absorptive properties to ultra-violet or infra-red rays as well as the visible and/or invisible rays ingredients such as Sudan III, Chrysodoin, etc., may be incorporated in the resinous materials.

In the case of infra-red absorption, the lens 15 may be provided with a thin film of material such as gold or aluminum to reflect and/or absorb the infra-red rays. Ferrous compounds in finely divided form may be dispersed in the material in its unpolymerized condition to render the resultant article infra-red absorbent.

Alkaloidal compounds such as quinine, etc., may be dissolved in the material for the purpose of producing ultra-violet absorption. The amount, thereof, being varied to control said absorption properties.

The portion 17 is formed by an apparatus similar to that diagrammatically illustrated in Fig. X by carrying out the various processes described above in connection with the formation of the part 15, only in this particular instance, the portion 17 is formed relatively soft, pliable and elastic. This is accomplished by using partially polymerized methyl methacrylate containing a plasticizer such as dibutyl phthalate, methyl phthalyl ethyl glycolate, dibutyloxy ethyl phthalate or triglycol dihexoate etc. and thereafter completely polymerize. Instead of the above an acrylate or methacrylate of higher alcohol or alcohols such as propyl, butyl, etc., may be used or propylacrylate, propyl methacrylate, butyl acrylate, butyl methacrylate, etc., may be used.

All of the above will be soft and pliable, and yet elastic, and will retain the form taken during polymerization, and also may be molded when completely polymerized by heating and compressing.

The portion 17 is provided centrally with an opening having an angled peripheral edge 36 shaped to receive the angled edge 35. In this particular instance, as shown in Fig. XIII, the angled edges are integrally joined by the use of a suitable solvent such as ethyl acetate, etc.

If desired, molding or casting means, such as shown in Fig. XIV, may be used, in which instance, the portion 15 is supported in a portion 37 of the molding or casting means of a sliding weight pressed plunger, or the like 38. This plunger may be formed of glass or metal as desired and has its engaging end formed to the desired curvature. In this instance the portion 15 is held in position and the portion 17 is thereafter formed and integrally joined, therewith.

It is apparent that the portions 15 and 17 may be simultaneously formed from partially polymerized material having the characteristics desired, and that the polymerization may be completed while the formed materials are supported in the casting or molding means, as shown in Fig. XIV.

Prior to the forming of said portions 15 and 17, which have been described herein, only by way of illustration of how any of the various lenses embodying the invention may be formed, suitable anesthetics or antiseptics of the type commonly known may be mixed with the composition from which the said portions are formed.

From the foregoing description it will be seen that simple, efficient, and economical means and process have been provided for accomplishing all the objects and advantages of the invention, particularly that of providing a lens of the type adapted to be held in contact with the eye of the wearer, wherein the portion in engagement with the eye will be relatively soft, pliable and elastic, and of such a nature as to positively and comfortably maintain the lens portion in accurate position. In most all of the lenses shown and described, the main lens portions are preferably formed relatively hard, and of a non-shatterable nature.

The resultant lenses will be exceptionally light in weight, normally tough and transparent and of a non-corrosive, non-tarnishable nature. The porous characteristics of the supporting portions of said lenses provide means for overcoming surface irritations by permitting circulation of the eye secretions. This enables such lenses to be worn with comfort for a much longer period of time than has been usual with lenses of this character in the past.

Having described my invention I claim:

1. An eye contact lens comprising a main lens portion of transparent completely polymerized methyl methacrylate material formed with a catalyst of an amount to produce a desired degree of hardness and having adhesion resistant outer surface characteristics shaped to produce a given refractive value when in position of use on the eye and a peripheral supporting portion integrally united by polymerization with said main lens portion, said supporting portion being of plasticized known artificial resinous material formed with a plasticizer of an amount to produce a desired degree of softness and having adhesion resistant outer surface characteristics with the outer and inner surfaces thereof blending gradually with the outer and inner surfaces of the main lens portion with the inner surface shaped to fit the general contour shape of the scleral portion of the eye, and said supporting portion also being relatively soft, pliable and of a material resistant to secretions of the eye.

2. An eye contact lens comprising a main lens portion of transparent substantially completely polymerized methyl methacrylate material formed with a catalyst of an amount to produce a desired degree of hardness and having adhesion resistant outer surface characteristics shaped to produce a given refractive value when in position of use on the eye and a peripheral supporting portion united with said main lens portion by an integral bond resulting from the intermingling of the materials of said portions where united, said supporting portion being of plasticized artificial resinous material formed with a plasticizer of an amount to produce a desired degree of softness and having adhesion resistant outer surface characteristics with the outer and inner surfaces thereof blending gradually with the outer and inner surfaces of the main lens portion with the inner surface shaped to fit the general contour shape of the scleral portion of the eye and said supporting portion also being relatively soft, pliable and of a material resistant to secretions of the eye.

3. An eye contact lens comprising a main lens portion of transparent substantially completely polymerized methyl methacrylate material formed with a catalyst of an amount to produce a desired degree of hardness and having adhesion resistant outer surface characteristics shaped to produce a given refractive value when in position of use on the eye and a peripheral supporting portion united with said main lens portion by an integral bond resulting from the intermingling of the materials of said portions where united, said supporting portion being of plasticized artificial resinous material formed with a plasticizer of an amount to produce a desired degree of softness and having adhesion resistant outer surface characteristics with the outer and inner surfaces thereof blending gradually with the outer and inner surfaces of the main lens portion with the inner surface shaped to fit the general contour shape of the scleral portion of the eye and said supporting portion also being relatively soft, pliable and of a material resistant to secretions of the eye and having a plurality of perforations therein.

4. An eye contact lens comprising a main lens portion of transparent substantially completely polymerized methyl methacrylate material formed with a catalyst of an amount to produce a desired degree of hardness and having adhesion resistant outer surface characteristics shaped to produce a given refractive value when in position of use on the eye and a peripheral supporting portion united with said main lens portion by an integral bond resulting from the intermingling of the materials of said portions where united, said supporting portion being of plasticized artificial resinous material formed with a plasticizer of an amount to produce a desired degree of softness and having adhesion resistant outer surface characteristics with the outer and inner surfaces thereof blending gradually with the outer and inner surfaces of the main lens portion with the inner surface shaped to fit the general contour shape of the scleral portion of the eye and said supporting portion also being relatively soft, pliable and of a material resistant to secretions of the eye and being of a porous nature.

HAROLD R. MOULTON.